Patented Dec. 24, 1935

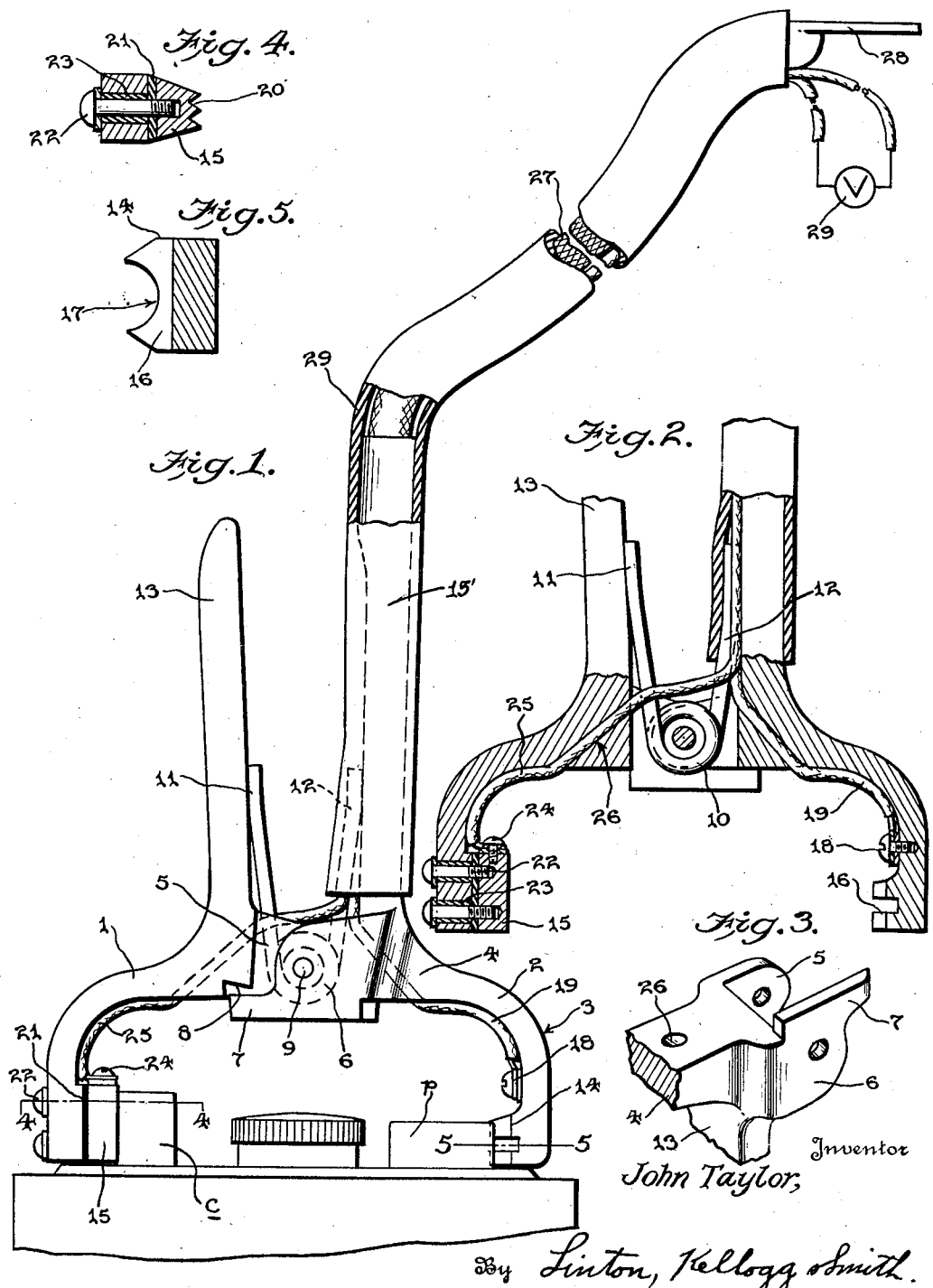

2,025,363

UNITED STATES PATENT OFFICE 2,025,363

BATTERY TESTING CLIP

John Taylor, Chicago, Ill., assignor, by mesne assignments, to Joseph Weidenhoff, Incorporated, Chicago, Ill., a corporation of Illinois Application October 31, 1929, Serial No. 403,859

4 Claims. (Cl. 173—324)

This invention relates to improvements in electric storage battery terminal clips and more particularly, to a novel and advantageous form of testing clip for use in connection with the cells of an electric storage battery, the invention having for an object, to provide a clip of simple and durable construction, which may be quickly and effectually engaged with the terminals of a battery cell and during such engagement, ensure a positive electrical connection with the battery irrespective of the accumulation of corrosive or other foreign matter upon such terminals.

It is also an object of the invention to provide a testing clip of the character mentioned, which with operative connection with the cells of a storage battery, will have the contact jaws thereof brought into and retained in positive electrical and mechanical engagement therewith, hence, eliminating all movement of the jaws with respect to the battery cell terminals and consequently thereupon, preventing any break in the electrical connection, as well as maintaining the same at a constant efficient peak.

Yet another object of the invention may be stated to reside in the provision of a battery clip wherein the contact jaws are caused to have an embracing engagement with the terminals of a storage battery cell when arranged in an operative position thereupon, such engagement being under a constant uniform urge and pressure exerted upon said jaws and the extent of inward movement of the jaws being limited, whereby to facilitate effectual and practical usage of the clip.

Other objects of the invention will be in part obvious and in part pointed out hereinafter.

In order that the invention and its mode of operation may be readily understood by persons skilled in the art, I have in the accompanying illustrative drawing, and in the detailed following description based thereon, set out several possible embodiments of the same.

In this drawing:

Figure 1 is a fragmentary elevation of my improved testing clip;

Figure 2 is a fragmentary detail in longitudinal section through the clip showing the arrangement of the spring means for exerting pressure and urge of inward pivotal movement to the contact jaws;

Figure 3 is a fragmentary detail in perspective of the pivotal bracket formation upon the inner ends of each of the jaw carrying bodies of the clip;

Figure 4 is a transverse section taken on the line 4—4 of Figure 1, and

Figure 5 is a similar section taken on the line 5—5 of Figure 1.

Having more particular reference to the drawing, in connection with which like characters of reference will designate corresponding parts throughout, the improved clip may be stated to comprise complemental jaw carrying bodies 1 and 2, said bodies being formed of an effectual electrically conductive metal or corresponding material and having portions of the same curved upon themselves as indicated by the numeral 3, the extremities of such curved portions serving as contact jaw carrying means, hereinafter more fully described. The remaining ends of the jaw carrying bodies 1 and 2 are thickened as indicated by the numeral 4 and each thereof are formed with substantially U-shaped pivoting brackets. Each of these substantially U-shaped pivoting brackets are formed with arms 5 and 6, arranged in parallelism. The arms 6 are of greater lengths than are the arm 5, and outwardly extending integral fingers 7 are formed upon the lower side of the free portion of each of said arms 6, being adapted to be normally engaged in seats 8 provided therefor in the adjacent thickened portions 4 of the opposite jaw carrying body 1 or 2, that is, when the clip is not engaged with the terminals of an electric battery storage cell.

The arms 5 and 6 of the U-shaped pivoting brackets of the jaw carrying bodies 1 and 2 are adapted to be arranged in relatively overlapping relationship, upon assembling of the device and, these arms 5 and 6 are each formed with bearing openings adapted to be brought into alinement whereby to permit of the transverse passage of an interconnecting pivot pin 9 therethrough, the opposite ends of said pin being upset or swaged, to prevent lateral displacement of the same, and the intermediate portion of said pin, i. e., the portion between the arms of said U-shaped pivoting brackets, having a heavy coiled spring 10 arranged thereabout; the opposite ends of this spring, indicated by the numerals 11 and 12, having bearing engagement with the inner sides of actuating arms 13 and 13' fixedly carried upon or formed integral with the normally outer end portions of the jaw carrying bodies 1 and 2. In this connection, it is to be noted that the actuating arm 13' is formed of a greater length than is the arm 13 and also, that the free end of this arm is so constructed as to permit of the positive engagement of an electrical conductor, hereinafter more fully described, therethrough.

From the foregoing, it will be seen that the jaw carrying bodies 1 and 2 are pivotally interconnected through the medium of the engagement of the pivot pin 9 through the bearing openings of the overlapping arms 5 and 6 of the substantially U-shaped brackets formed upon the thickened portions of said bodies 1 and 2 and furthermore, that because of the arrangement of the heavy coiled spring 10 over the intermediate portion of said pivot pin 9 and the engagement of the opposite extremities 11 and 12 of said spring with fixed portions of the arms 13, a normal urge of relatively inward movement will be imparted to the free or normally inner ends of the bodies 1 and 2. The extent of this relatively inward movement between the free or normally inner ends of the bodies 1 and 2, of course, will be effectually limited by the engagement of the finger extensions 7 of the arms 6 in the seats 8 provided therefor in the opposite jaw carrying body.

To effect electrical connection with the terminals of a storage battery cell, that the clip may be effectually used, the free or normally inner ends of the jaw carrying bodies 1 and 2 are provided with contact jaws 14 and 15.

The contact jaw 14, as is well shown in the Figure 5, consists of relatively longitudinally spaced teeth 16 having the inner surfaces thereof formed with curved recesses 17, whereby to facilitate a positive engagement with the terminal post of a storage battery cell, such as indicated by the reference letter p. In this connection, it is to be noted that the contact jaw 14 is formed integral with that end of the body 2 carrying the same and upon an adjacent portion of said body, I engage a contact screw or similar electrical connection, indicated by the numeral 18, attaching or securing to this connection 18, an electrical conductor 19, which, as will be noted upon reference to the Figures 1 and 2, is extended longitudinally of the body 2 for a distance therebeyond as hereinafter more fully described.

The contact jaw 15, consists of a separate metal block (a preferably highly electrically conductive metal), the opposite sides of said block being inwardly tapered and the outer face thereof being formed with serrations or teeth 20 extending longitudinally throughout the entire length of the same. The opposite face of the contact jaw 15 is formed plane and is adapted to be arranged adjacent the inner side of the free end of the jaw carrying body 1, as is well shown in the Figures 1 and 2; an insulating strip 21 being interposed therebetween, while securing screws 22 passed through insulation lined openings 23 in said free end of the body 1 are passed into screw threaded engagement with the contact jaw 15 and upon tightening, obviously, serve as effectual means for securing said jaw to its particular carrying body. The normally inner end of the contact jaw 15 has a contact screw 24 engaged therewith and this screw serves as a means for positively connecting the adjacent end of an electrical conductor 25 thereto, said conductor being extended longitudinally of the carrying body 21 and passed through an opening or way 26 formed therein outwardly and longitudinally of the arm of the opposite body 2, as is shown in the Figure 2.

From the foregoing, it will be seen that the normally inner or free ends of the jaw carrying bodies 1 and 2 are equipped with effectual contact jaws, the jaw 15, because of its formation and positioning, being especially advantageous for effecting mechanical and electrical connection with a storage battery cell connector c, while the contact jaw 14 will be found especially advantageous for use in engagement with the adjacent peripheral surface of a contact post p.

The usual stranded or woven strand electrical conductor 27 is fixedly and electrically connected at one end to one of the arms 13 of the jaw carrying bodies 1 or 2 and in this particular instance, to the arm 13 of the jaw carrying body 2; the outer end of said conductor or cable being provided with a connector terminal 28. The conductors 19 and 25 are coincidentally disposed with respect to the conductor 27, though, of course, they are insulated therefrom, and to effect this relative arrangement, I engage over all of said conductors, an insulating sleeve or tubing, formed of rubber or other suitable material and indicated by the numeral 29, the inner extremity of this sleeve or tubing 29 being engaged over the adjacent arm 13, as is shown in the Figure 1.

The outer or free extremities of the conductors 19 and 25 are electrically connected to a voltmeter or similar electrical measuring device, indicated for convenience by the numeral 29.

In usage of my improved testing clip, two of these clips are employed. In this connection, it will be understood that each of the clips will span the entire cell of a storage battery, effecting engagement with the post p at one end of the cell and the cell connector c at the opposite end of the cell. By reason of the pivotal engagement between the jaw carrying bodies 1 and 2 and the provision of the spring urge means 10, it will be furthermore understood that the free ends of the bodies 1 and 2, carrying the contact jaws 15 and 14, respectively, will have an urge of normally inward movement imparted thereto and by reason of the tension of this spring means, pressure or urge of said relatively inward movement will be such as will effect a positive mechanical and electrical connection of the contact jaws with their respective cell terminals. In using the two clips, aforesaid, in the testing of a storage battery, one of these clips has an electrical connection extending from the negative post across the cell, and the other of said clips has an electrical connection from the positive post across its particular cell. With the two clips attached to the battery being tested, in the indicated manner, the highest rate of current flowing from the storage battery may be used for discharging purposes, inasmuch as the clips will successfully withstand any amount of amperage. The electrical conductors 19 and 25 extending from the contact jaws of each of the clips into engagement with the electrical measuring device 29, will serve as a means for giving or indicating the low voltage on the end cell and the center cell of the storage battery being tested and inasmuch as these conductors extend to voltmeters which are connected in parallel with the ammeter of an ordinary electrical testing machine, they will also serve as a means for giving the voltage drop on the voltmeter when a heavy discharge is being made from the storage battery.

In engaging the improved clip with the opposite terminals of a storage battery cell, it, of course, will be understood that the user grasps the operating arms 13 in his hand and by imparting a squeezing movement thereto, will effect outward pivotal movement between the free or normally outer extremities of the body carrying jaws 1 and 2, hence increasing the distance between the contact jaws 14 and 15 and allowing said jaws to be conveniently placed in adjacent positions or positions in proximity to the post $p$ and connector bar $c$ of a battery cell to be tested. At this time, pressure from the user's hand is released and under the urge or influence of the heavy coiled spring 10, the jaw carrying bodies 1 and 2 will have relatively inward pivotal movement imparted thereto and consequently upon this, the toothed portions of the contact jaws 14 and 15 will be moved into a positive mechanical and electrical connection with their particular cell terminals.

At this point, it is to be understood that the tension of the coiled spring 10 is such as to exert an inward pressure upon the contact jaws 14 and 15, sufficient to force said jaws through any and all foreign accumulations or matters upon the terminals of the cell of an electric storage battery, such for example, as corrosion or the like and because of this, it will be understood and appreciated by workers skilled in the art, that a positive mechanical and electrical connection of the clip with a storage battery cell will be caused and that such connection will serve as a means for ensuring the efficient operation of the clip.

Manifestly, the construction shown is capable of considerable modification, and such modification as is within the spirit of my claims I consider within the spirit of my invention.

I claim:—

1. A binding post contactor for spaced battery posts comprising a pair of pivotally connected members affording at their lower sides clamping jaws and at their upper sides actuating handles, said jaw members having their terminal portions extending downwardly in substantially parallel position, a spring engaging said pivotally connected members so as to urge said jaw members together, and cooperating stop means carried by said pivotally connected members for maintaining said jaw members normally in substantially parallel position, a flexible cable secured to said contactor, said cable providing connection means to testing devices at least at three points, said connection means being in conductive relation through two connections with one of the spaced battery posts and the third connection means into conductive relation to the remaining battery post.

2. A binding post contactor for spaced battery posts comprising a pair of pivotally connected body members, said members affording at their upper sides handles and at their lower sides clamping jaws, spring means carried by said body members for urging said jaws toward each other, stop means carried by said body members for maintaining said jaw members in substantially parallel position against the force of said spring means, said handles being movable to move said jaws outwardly to enable them to engage the outer sides of adjacent battery posts, said handles being releasable whereby the spring means urges said jaws in contact with said posts, connecting means secured to said contactor and providing connection means to testing devices at least at three points, two of said connection means being in conductive relation to one of the spaced battery posts and the third connection means being in conductive relation to the remaining battery post.

3. A battery testing clip comprising a pair of pivotally connected bodies affording on their upper sides operating handles and on their lower sides clamping jaws, said jaws having parallel depending extremities, spring means carried by said body members for urging said extremities towards each other, cooperating stop means on said body members for maintaining said depending extremities in substantially parallel position against the force of said spring, said handles being movable to spread said body members whereby the extremities thereof may be brought into engagement with the outer sides of adjacent battery posts, and connection means placing one of said battery posts in conductive relation to two testing devices and the second battery post into conductive relation with another testing device.

4. A battery testing clip comprising a pair of pivotally connected bodies affording at their upper sides operating handles and at their lower sides clamping jaws, an insulated gripping plate secured to one of said bodies and adapted to be brought into engagement with one of two spaced battery posts, an electrical connection with said gripping plate, a second electrical connection adjacent the extremity of the other jaw, and a flexible cable secured to said clip, said cable providing connection means to testing devices at least at three points, said gripping plate and other jaw placing two of said connection means in conductive relation to one of the spaced battery posts and the third connection means into conductive relation to the remaining battery post.

JOHN TAYLOR.